May 26, 1970  K. HACKER ET AL  3,513,496
APPARATUS FOR SHAPING SHOE PARTS
Filed Aug. 7, 1968
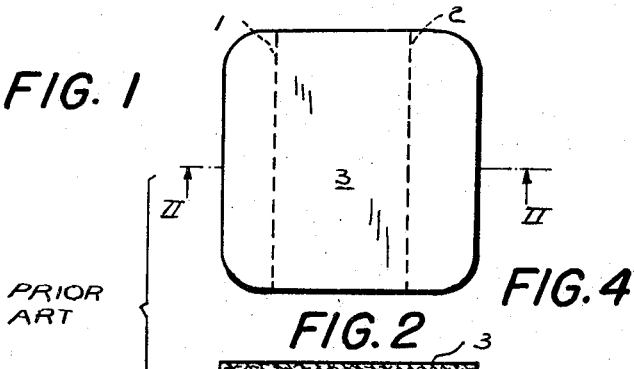
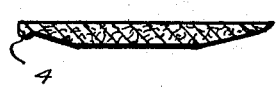
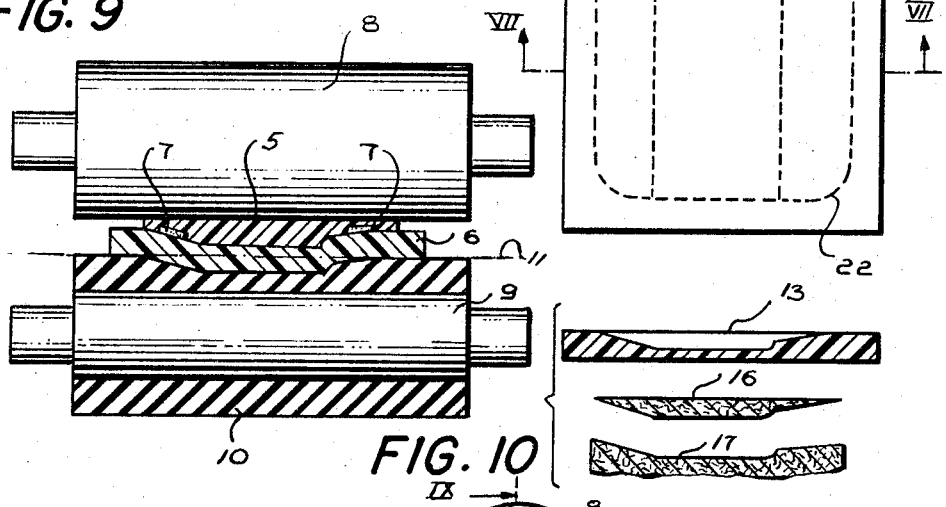
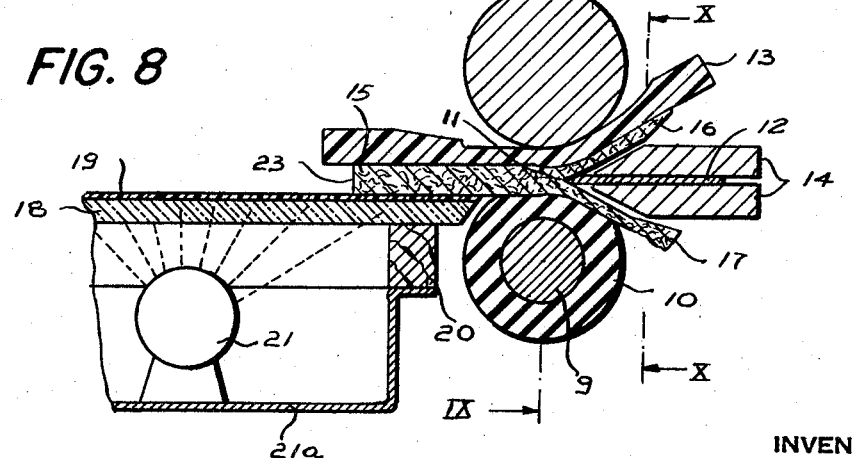
INVENTORS
KURT HACKER
GÜNTHER FICKERT
ERWIN KÖHL
BY Michael S. Striker
ATTORNEY

United States Patent Office 3,513,496
Patented May 26, 1970

3,513,496
APPARATUS FOR SHAPING SHOE PARTS
Kurt Hacker, Stuttgart-Zuffenhausen, Günther Fickert, Stuttgart, and Erwin Köhl, Stuttgart-Weilimdorf, Germany, assignors to Fortuna-Werke Maschinenfabrik Aktiengesellschaft, Stuttgart-Bad Cannstatt, Germany
Filed Aug. 7, 1968, Ser. No. 750,925
Claims priority, application Germany, Aug. 18, 1967, 1,685,399
Int. Cl. A43d *25/00*
U.S. Cl. 12—17                                    11 Claims

ABSTRACT OF THE DISCLOSURE

Shaped articles are obtained from leather blanks by placing a blank onto the top surface of a light-transmitting table, by thereupon placing a light-transmitting flexible pattern, one side of which has a cavity with a configuration corresponding to that of a shaped article, over the blank so that the cavity overlies the blank, by moving the blank and the pattern edgewise through the gap between a rigid roller and an elastic roller so that the pattern and the blank are deformed whereby a portion whose configuration corresponds to that of the cavity in the pattern protrudes at one side of the blank, and by severing the protruding portion from the remainder of the blank. A light source is placed below the table to facilitate proper positioning of the pattern with reference to the blank.

Background of the invention

The present invention relates to the production of shaped articles from blanks which consist of leather, imitation leather, cardboard, paper or analogous deformable material. More particularly, the invention relates to an apparatus for the production of shaped articles by removing some material at one side of a sheet-like or plate-like blank whereby the thus removed material constitutes a shaped article. Such shaped articles can be used as tongues, upper, toe caps, vamps and/or other prefabricated parts or articles of footwear or the like. The invention also relates to a method of making patterns for use in such apparatus.

Apparatus for the production of shaped articles from blanks which consist of leather or the like normally comprise a pair of rollers which transport a pattern and a blank edgewise toward a travelling cutter which severs the blank to remove therefrom a shaped article whose configuration corresponds to that of a cavity which is provided in one surface of the pattern. The rollers deform the pattern and the blank so that a portion of the blank, whose configuration corresponds to that of the cavity in the pattern and hence to that of the desired article, protrudes at one side of the blank and the aforementioned cutter is positioned to separate the protruding portion from the remainder of the blank.

The dimensions of patterns which are utilized in conventional apparatus correspond to those of a finished shaped article. Such patterns normally comprise a base plate or sheet which consists of leather or analogous flexible material and carries at one of its sides strips which define with the base plate a cavity or recess with a configuration corresponding to that of the desired article. The manufacture of such composite patterns involves much time and their useful life is rather short. Furthermore, inaccuracies are likely to develop in assembly of such patterns whereby a full series of articles produced with the help of a defective or inaccurate pattern must be discarded. Therefore, the just described patterns failed to gain widespread acceptance in shoe industry and other leather processing industries wherein a large variety of shaped articles must be produced with a high degree of accuracy in different sizes and shapes, particularly such articles wherein the marginal portions taper toward the edges.

Additional problems arise in the manipulation of just described conventional patterns. As a rule, a blank of leather or the like is placed onto a plate-like table of the apparatus and the pattern is placed over the blank. The accuracy of alignment between the blank and the pattern depends on the carefulness and skill of the operator. If the alignment is not satisfactory, or if the pattern is shifted with reference to the blank during transport toward and past the cuttter, the shaped article is formed with marginal beads and must be discarded because such beads prevent proper wiping, bending and other steps in the assembly of an article of footwear or the like.

Further problems arise in connection with proper alignment between the blank and the pattern prior to transport toward the cutter, and such problems are due mainly to the fact that the pattern is normally placed over the blank, i.e., that it conceals the blank and thus interferes with observation of the blank during alignment. Attempts to overcome such problems include placing the pattern onto the table and thereupon placing the blank over the pattern. However, such mode of alignment necessitates the inversion of the pattern and blank prior to severing so that the pattern and blank are likely to become misaligned during inversion. Of course, one could also resort to relatively large blanks; however, this would cause excessive waste in valuable material. It is also known to provide a temporary bond between the pattern and the blank prior to inversion and to thus insure that the blank cannot be shifted relative to the pattern during inversion and/or during severing. A drawback of such procedure is that the spots or strips of adhesive which is employed to establish a temporary bond between a pattern and successive blanks are likely to be covered with leather dust so that their bonding action becomes weaker after a short period of use. Moreover, the adhesive is likely to leave traces at the outer side of a piece of leather so that such traces must be removed by hand or they detract from the appearance of the finished product. Repeated application of adhesive strips or spots consumes much time.

Summary of the invention

One of the objects of our present invention is to provide a novel and improved apparatus for the production of shaped articles consisting of leather or like deformable sheet material and to provide a novel and improved pattern which can be utilized in such apparatus.

Another object of the invention is to provide an apparatus wherein the pattern can be readily, rapidly and accurately aligned with successive blanks prior to removal of shaped articles from such blanks.

A further object of the invention is to provide a novel and improved method of producing patterns for use in apparatus of the above outlined character.

An additional object of the invention is to provide a pattern which can be properly and rapidly aligned with successive blanks without necessitating bonding of the patterns to blanks and/or inversion prior to transport past the cutter.

Still another object of the invention is to provide a novel and improved pattern which can be utilized in the above outlined apparatus and which renders it possible to remove shaped articles from blanks with minimal waste and with an accuracy which cannot be matched by presently known apparatus.

A concomitant object of the invention is to provide an apparatus wherein the pattern and a blank which is aligned therewith can be transported past a cutter without necessitating temporary bonding of the pattern to the blank.

The improved mehod comprises the steps of placing a master whose configuration corresponds to that of a shaped article against one surface of a flexible panel consisting of light-transmitting (transparent or translucent) material, applying pressure against the master to cause its penetration into the one surface of the panel whereby a portion of the material of the panel—corresponding in size and shape to that of the master—protrudes at the other surface of the panel, and severing the protruding portion from the remainder of the panel whereby such remainder constitutes a pattern having in its other surface a cavity whose configuration matches that of the master. The removed portion of the panel may constitute a master.

Since the thus obtained pattern consists of light-transmitting material, it can be readily and rapidly aligned with a blank which is placed onto a light-transmitting support member located at a level above an illuminating device which permits observation of the blank between the pattern and the support member.

In order to prevent relative movement between the master and the panel during severing of the protruding portion at the other surface of the panel, the two parts are preferably bonded to each other by spots of adhesive and/or by adhesive-coated bands or strips, and such adhesive is removed upon completion of the severing step. It will be seen that the novel method facilitates the production of one-piece patterns so that the aforementioned steps employed in assembly of conventional patterns with a base sheet and strips attached to one side of the base sheet can be dispensed with.

The novel features which are consider as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

Brief description of the drawing

FIG. 1 is a plan view of a conventional pattern;

FIG. 2 is a sectional view of the pattern as seen in the direction of arrows from the line II—II of FIG. 1;

FIG. 3 is a sectional view of a defective shaped article which is produced by resorting to the pattern of FIGS. 1 and 2;

FIG. 4 is a sectional view of a panel which is about to be converted into a novel pattern;

FIG. 5 is a sectional view of a master which is employed in connection with the production of the novel pattern;

FIG. 6 is a plan view of the novel pattern;

FIG. 7 is a sectional view as seen in the direction of arrows from the line VII—VII of FIG. 7;

FIG. 8 is a longitudinal vertical sectional view of the apparatus;

FIG. 9 is a transverse vertical sectional view as seen in the direction of arrows from the line IX—IX of FIG. 8; and FIG. 10 is a sectional view substantially as seen in the direction of arrows from the line X—X of FIG. 8 and illustrates the pattern, a finished article, and the remainder of a blank.

Description of the preferred embodiments

FIGS. 1 and 2 illustrate a conventional pattern whose dimensions correspond to those of a blank. This pattern comprises a sheet-like base 3 and strips 1, 2 which are produced separately and are bonded to the base 1. If the pattern of FIGS. 1 and 2 (or one of its parts) is defective, this results in the production of an entire series of defective shaped articles. Also, and if the blank is misaligned, the resulting shaped article (shown in FIG. 3) is formed with a bead 4 and must be discarded.

FIGS. 6 and 7 illustrate a pattern 13 which is produced in accordance with the method of the present invention. This pattern is obtained in response to removal of material from a light-transmitting panel 6 (shown in FIGS. 4 and 9) one side of which is temporarily bonded to a master 5 by one or more adhesive-coated uniting bands or adhesive spots 7. The resulting assembly is then introduced into the gap between the peripheral surface on the cylindrical portion of a rigid upper roller 8 (FIG. 9) and the peripheral surface of a lower roller 9 which is provided with a cylindrical portion or mantle 10 of elastomeric material. The panel 6 is then fed by rollers 8, 9 edgewise against the cutting edge 11 of an endless travelling band-like cutter 12 which moves between fixed guides 14 (FIG. 8). The cutting edge 11 removes at the underside of the panel 6 a protruding portion whose configuration and dimensions correspond to those of the master 5. The resulting pattern 13 (FIGS. 6 and 7) is thus provided with a recess or cavity 22 which can accommodate the master 5. The panel 6 consists of a material which is either transparent or translucent.

The pattern 13 is thereupon utilized in the production of shaped articles 16 consisting of leather or imitation leather. A plate- or sheet-like blank 15 of such material is placed onto a light-transmitting (transparent or translucent) support member of table 18 (FIG. 8) which is provided with a light-transmitting top layer or coat 19, and the finished pattern 13 is placed over the blank 15 so that its marginal portions extend beyond the outlines of such blank. An illuminating device 21 is positioned below the table 18 to facilitate proper positioning of the pattern 13 with reference to the blank 15. The pattern must be positioned in such a way that its cavity 22 fully overlies the blank 15, i.e., that the outline of such cavity does not extend beyond the edges 23 of the blank 15. The area of the blank 15 preferably equals that of the cavity 22.

The smooth top surface of the coat 19 permits sliding movements of the blank 15 with minimal friction so that, once the pattern 13 is properly located with reference to this blank, these parts can be moved as a unit along the coat 19 and into the gap between the rollers 8, 9. The edge 11 of the cutter 12 then severs the blank 15 and separates therefrom a finished article 16. The remaining portion 17 of the blank 15 constitutes a reject.

The outline of the blank 15 is readily discernible to a person looking at the upper side of the pattern 13 on the table 18 of FIG. 8 so that the cavity 22 can be rapidly positioned in such a way that its edges coincide with the edges 23 of the blank. The table rests on wooden strips 20 which are placed on top of a housing 21a for the illuminating device 21.

An important advantage of the pattern 13 is that it consists of a single piece of light-transmitting material which is preferably selected in such a way that it allows for repeated flexing and other deformation of the pattern during travel through the gap between the rollers 8, 9 of the conveyor shown in FIGS. 8 and 9. These rollers are preferably driven by a motor through a suitable transmission, not shown, at the same peripheral speed. The transparency or translucency of the material of the pattern 13 should be such that it permits for rapid and accurate alignment of the blank 15 with the cavity 22. The table 18 and/or its coat 19 preferably consists of light-dispersing material to insure uniform illumination of marginal portions of the pattern 13, i.e. of such portions which extend outwardly beyond the outlines of the cavity 22. If desired, the pattern 13 can be provided with opaque lines (not shown) registering with the outline of a blank 15 when the latter is properly aligned with the pattern while resting on the top surface of the coat 19.

In order to insure that the pattern 13 is not shifted with reference to the blank 15 during transport into the gap between the rollers 8, 9, the material of the coat 19 is preferably selected, and its top surface finished, in such a way that friction between the surface at the underside of the pattern 13 and blank 15 exceeds considerably that between the blank and the top surface of the coat 19. This insures that the blank 15 and the pattern 13 can be moved as a unit even though the upper side of the blank is not bonded to the underside of the pattern. In other words, the coefficient of friction of the material of the pattern 13 should be much higher than that of the material of the coat 19. If the strength of the material which meets such requirements is not satisfactory, the panel 18 can be assembled of several layers of light-transmitting material at least one of which (i.e., the coat 19) is sufficiently smooth to insure that friction between the coat and the blank 15 is considerably less than the friction between the blank and the pattern 13. The outer (good) side of the blank 15 is adjacent to the underside of the pattern 13 when the blank rests on the coat 19. The smoothness of such outer side exceeds the smoothness of the inner side of the blank and, therefore, the material of the pattern should be such as to insure relatively strong frictional engagement with the outer side of the blank when the pattern and the blank are pushed or otherwise fed into the gap between the rollers 8, 9. For example, at least the coat 19 of the table 18 may consist of polytetrafluoroethylene (PTFE) or an analogous synthetic plastic material. The pattern 13 may consist of so-called transparent rubber. It is desirable to produce the pattern 13 of a material whose hardness at least equals but preferably exceeds 70 Shore. This insures that the pattern can be caused to repeatedly pass between the rollers 8, 9 and also that the pattern will retain its shape in undeformed condition after repeated flexing during the formation of successive articles 16. Moreover, and since the pattern 13 is produced substantially in the same way as a shaped article 16, its material must be selected with a view to insure the formation of an accurately and sharply defined cavity when the panel 6 and the master 5 are caused to pass (once or more than once) through the gap between the rollers 8, 9. That surface of the panel 6 which is to be bonded to the master prior to removal of material and the other surface of the panel should be finished to a high degree of smoothness to insure that the adhesive 7 can be removed without any traces prior to utilization of the resulting pattern 13 in the manufacture of articles 16. This insures that the pattern does not change its position with reference to a blank 15 during travel through the gap.

The material of the master 5 should have a hardness which at least matches that of the panel 6. As stated before, the cavity 22 can be formed during a single pass or in response to repeated transport of the panel 6 and master 5 through the conveyor of FIG. 7 or an analogous conveyor. The panel 6 then replaces the blank 15, i.e., it rests initially on the top surface of the coat 19. The adhesive patches 7 are removed from the finished pattern 13 prior to its utilization in the manufacture of articles 16.

Another important advantage of a pattern which consists of light-transmitting material is that it can be utilized in connection with the production of right-hand or left-hand articles. This is particularly important in the manufacture of articles which form part of shoes, boots, sandals, slippers and/or other articles of footwear. Thus, the pattern 13 can be placed onto the blank 15 of FIG. 8 in such a way that its cavity 22 faces toward or away from the blank. Articles which are produced when the cavity 22 of the pattern 13 faces the coat 19 of the table 18 are mirror symmetrical replicas of the article 16.

What is claimed as new and desired to be protected by Letters Patent is set forth in the appended claims:

1. Apparatus for removing shaped articles from plate-like blanks consisting of leather or other deformable material, comprising a light-transmitting support member having a top surface arranged to support a blank thereon; a light-transmitting deformable pattern having a surface provided with a cavity whose configuration corresponds to that of the shaped article to be removed from the blank and adapted to be placed over the blank on said support member; illuminating means positioned to direct light upwardly through said support member and to thus facilitate placing the cavity of said pattern over the blank; conveyor means for moving the blank and said pattern edgewise off said support member and including means for deforming the blank and the pattern whereby that portion which is to form a shaped article protrudes at one side of the blank; and cutter means for severing such protruding portion from the remainder of the thus deformed moving blank.

2. Apparatus as defined in claim 1, wherein said deforming means includes a first driven roller comprising a rigid cylindrical portion having a peripheral surface and wherein said conveyor means further includes a second driven roller comprising an elastic cylindrical portion having a peripheral surface defining with the first mentioned peripheral surface a gap whose width in undeformed condition of said elastic cylindrical portion is less than the combined thickness of a blank and said pattern.

3. Apparatus as defined in claim 2, wherein said first roller is located at a level above said second roller.

4. Apparatus as defined in claim 1, wherein said top surface is smooth to permit sliding movement of the blank along such surface with minimal friction.

5. Apparatus as defined in claim 1, wherein the hardness of the material of said pattern at least equals 70 Shore.

6. Apparatus as defined in claim 1, wherein said pattern consists of a material which is capable of withstanding repeated flexing.

7. Apparatus as defined in claim 1, wherein said pattern has smooth surfaces.

8. Apparatus as defined in claim 1, wherein the material of said pattern has a high coefficient of friction.

9. Apparatus as defined in claim 1, wherein said pattern has marginal portions surrounding said cavity.

10. Apparatus as defined in claim 1, wherein said pattern consists of a single piece of flexible material.

11. Apparatus as defined in claim 1, wherein the finishes of said top surface and of that surface of said pattern which abuts against the blank on said support member are such that friction between the blank and the pattern exceeds friction between the blank and said support member.

References Cited

UNITED STATES PATENTS

| | | | |
|---|---|---|---|
| 2,788,535 | 4/1957 | Tilson | 12—17 |
| 3,147,500 | 9/1964 | Ralphs | 12—17 X |
| 2,989,762 | 6/1961 | Midgley | 12—17 |
| 3,002,207 | 10/1961 | Sweeney | 12—17 |

PATRICK D. LAWSON, Primary Examiner